United States Patent [19]
Fahey

[11] 3,989,922
[45] Nov. 2, 1976

[54] PULSED ARC WELDING APPARATUS
[75] Inventor: Michael D. Fahey, Half Moon Bay, Calif.
[73] Assignee: United Air Lines, Chicago, Ill.
[22] Filed: May 16, 1974
[21] Appl. No.: 470,575

[52] U.S. Cl. .................... 219/131 R; 219/131 WR
[51] Int. Cl.² ....................................... B23K 9/00
[58] Field of Search ..... 219/131 F, 131 WR, 131 R, 219/135, 137 PS; 323/22 SC

[56] References Cited
UNITED STATES PATENTS

| | | | |
|---|---|---|---|
| 3,284,666 | 11/1966 | Hajicek | 219/131 R X |
| 3,308,340 | 3/1967 | Gille et al. | 219/131 R X |
| 3,622,744 | 11/1971 | Main et al. | 219/137 |
| 3,777,113 | 12/1973 | Arikawa et al. | 219/131 R X |
| 3,818,177 | 6/1974 | Needham et al. | 219/131 R |
| 3,826,890 | 7/1974 | Bartlett | 219/131 R |
| 3,838,244 | 9/1974 | Petrides et al. | 219/131 R X |

FOREIGN PATENTS OR APPLICATIONS

| | | | |
|---|---|---|---|
| 2,024,276 | 1/1971 | Germany | 219/131 WR |
| 276,289 | 6/1969 | U.S.S.R. | 219/131 R |

Primary Examiner—J. V. Truhe
Assistant Examiner—Clifford C. Shaw
Attorney, Agent, or Firm—Neuman, Williams, Anderson & Olson

[57] ABSTRACT

A pulsed arc welding system is disclosed in which improved performance is obtained through the use of positive switch control in the welding transformer secondary winding. The switch means is programed through solid-state gate drivers which are in turn controlled for controlled rectification on each half cycle by a phase control, the operation of which is initiated by sensing the secondary winding voltage. Thus, it is possible to accurately control a high current interval and a low current interval with precision to obtain optimum welding and weld control.

The time intervals for high level and low level welding current are also precisely controlled through digital counting techniques which permit a full range of control from zero to one hundred per cent high current mode of operation and a high current period as well as a low current period varying from 1/60 to 1-4/5 seconds.

15 Claims, 6 Drawing Figures

PULSED ARC WELDING APPARATUS

BACKGROUND OF THE INVENTION

In stick or MIG welding, pulsed arc welding is a relatively new art. It is intended to obtain, by pulsing, many of the advantages of spray transfer welding or similar high current welding techniques and at the same time some of the benefits of globular transfer welding or similar operation at low current levels. By operating intermittently at the spray transfer current level and then at the globular current level, it is possible to perform a pulsed spray process of welding at current levels much below those required for continuous spray transfer but still avoid the poorer quality welds which characterize globular welding.

The need for improved pulsed arc welding has been apparent as past apparatus has been erratic and unprecise. If one attempts to weld parts which do not have adequate heat transfer characteristics, the need to minimize heat input but attain spray levels of voltage and current become apparent to avoid overheating and excess penetration. For example, when vertical welding or overhead welding is performed, the high current necessary for spray transfer will result in a molten pool which can not be retained without a high level of thermal conductivity in the workpiece and thus, the formation of a satisfactory weld joint often becomes impossible. In the case of thin material, the high levels of weld current necessary for spray transfer result in burnthrough of the workpieces.

There have been efforts to cope with these problems in MIG welding including the use of smaller diameter electrodes and arranging work in the flat position rather than the vertical, horizontal and overhead positions. However, such expedients are obviously not practicable in many cases.

Thus, the pulsed spray transfer process was developed for MIG welding to switch the welding current back and forth between the spray transfer level of current and the globular transfer level. By this technique, there is an opportunity for cooling while the globular transfer is beginning. However, before the globular material is released the current increases to the spray transfer level and thus, accomplishes expedited spray transfer welding and metal deposition. This technique was known heretofore and is described in part at Pages 97–103 of the text "Welding Technology" published in 1968 by the American Technical Society, Chicago, Ill. 60637. Similar pulsed techniques have been tried for TIG, stick and plasma welding also.

Heretofore, the equipment utilized for pulsed arc welding has attempted to control the weld current levels exclusively through the use of a saturable reactor in the secondary winding of the weld transformer. Such control of this saturable reactor was typically by a DC control winding manually adjusted to attempt to increase the reactance of the saturable reactor during an interval for low current operation and then add DC current for an interval of high current operation during which the saturable reactor was more highly saturated. Such techniques have proven to be relatively slow, inaccurate, unpredictable and unsatisfactory. Furthermore, the time intervals for high and low current operation have also been crudely controlled on some occasions with the use of a relaxation or similar oscillator which drives a pulse width switch which in turn is fed to a driver for a reactor control device. Such techniques for time control have been relatively inaccurate and unstable and have limited the range of precision control.

SUMMARY OF THE INVENTION

This invention provides an improved system for use with pulsed arc welding apparatus and may either use commercially available welder controls or have a welder control manufactured for the particular combination. In a typical welder control, there may be provision for controlling the open circuit welding voltage as well as some control over the current when the arc is drawn. The latter is typically obtained through the use of a saturable reactor in series with the welding transformer secondary with a DC control for the reactor having a manual setting to determine welding current.

In addition to these basic control elements, there also may be a feeding mechanism for weld wire or welding stick as well as a control for the gases used in welding systems such as the tungsten inert gas (TIG) and metal inert gas (MIG) systems. The instant invention is of value and useful in combination and cooperation with all known types of arc welding including conventional stick welding, MIG and TIG and plasma or remote arc techniques.

The invention includes a pair of switch devices such as silicon controlled rectifiers connected in opposed parallel relationship with a welding transformer secondary in order to accurately control the time during each half cycle when the welding transformer secondary is passing current and thereby accurately control the total weld current. The invention may also use equivalent devices such as thyratrons, triacs or the like.

In accordance with the invention, a sensing system is employed to sense a combination of weld voltage and weld current to give a desired indication of the initiation of the welding voltage cycle and from this sensed information provide gating controls for the two silicon controlled rectifiers (SCRs). Furthermore in accordance with this invention the conduction in the weld transformer secondary is controlled in both directions in response to a single sensed voltage transition to avoid the nonuniform bilateral characteristics of typical welding transformer operation and heated workpieces.

The foregoing weld current control system is especially well-adapted for use in pulsed arc welding systems and the invention includes a timing and control system to cooperate with the secondary current SCR switching system in a pulsed arc welding operation. To this end, a pair of independent timers for high and low current interval determination are driven from a single 60 Hz clock input and each timer has manual adjustment to determine the duration of the high and the low welding intervals respectively. The timers automatically initiate one another alternatively and cyclically and these in turn provide outputs to the phase control circuit for the secondary winding current control system.

Through the combination of the unique solid-state bilateral secondary winding phasic control and switching and the digital interval timer improved ratio control of the high and low output currents regardless of the condition of an associated reactor is possible and precision welding using the pulse technique is greatly enhanced.

DESCRIPTION OF THE FIGURES

For a more complete understanding of the invention, reference will now be made to the accompanying drawings wherein.

DETAILED DESCRIPTION OF THE INVENTION

Figure 1:
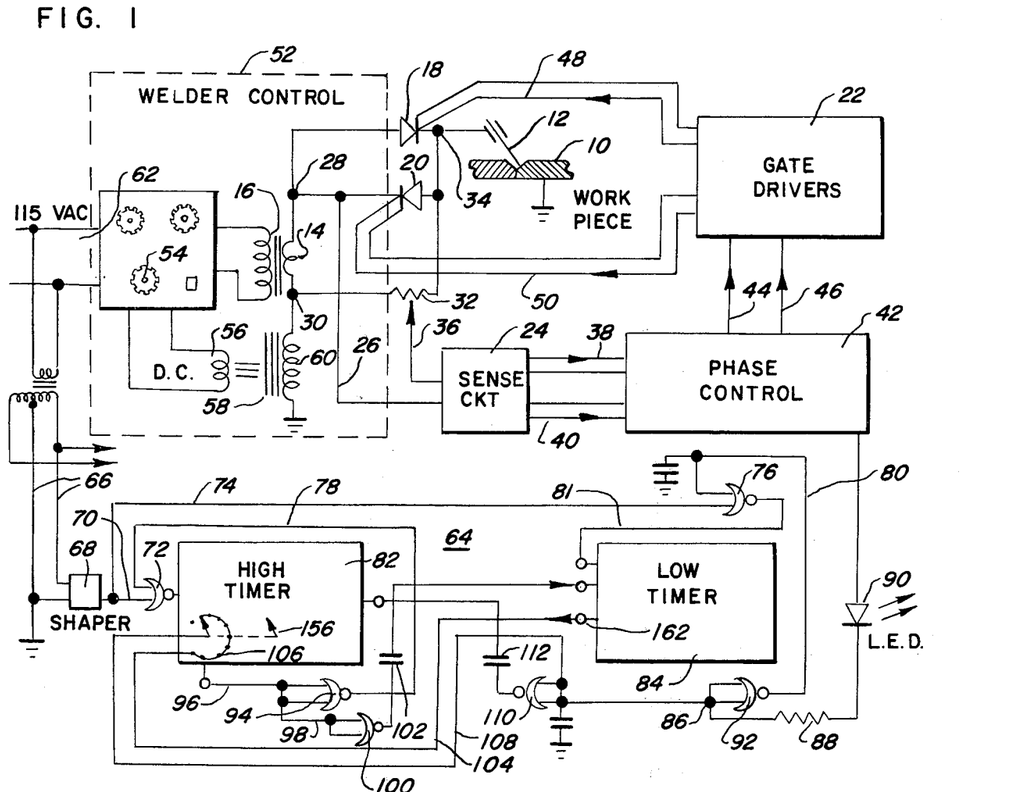
FIG. 1 is a block diagram showing the overall pulsed welding system of this invention.

Referring now to the drawings and more particularly to FIG. 1, an overall circuit and block diagram illustrating the invention is illustrated showing a workpiece 10 which is carefully grounded to complete a welding circuit in association with an electrode 12. The electrode 12 may be tungsten and thus, utilized exclusively as a source of arc potential and not as a source of material or it may be a welding electrode utilized in the MIG system where the metal electrode is deposited on the workpiece. It may also be a conventional stick electrode having a coating of an oxide or the like to provide the inert atmosphere as the electrode deteriorates and is deposited on the workpiece 10. If the electrode 12 is either a TIG or an MIG electrode there will be a source of inert gas surrounding the electrode at the workpiece but this is not illustrated as it is conventional in these modes of welding operation.

The electrode 12 is energized from the secondary winding 14 of a welding transformer having a primary winding 16. The secondary winding 14 is connected to the electrode 12 through a pair of SCRs 18 and 20 connected in parallel but with opposed polarity. The SCRs 18 and 20 are energized from a pair of gate drivers contained in the gate driver block 22. Because of the difference in the thermal characteristics of the workpiece 10 and the electrode 12 as well as other factors, the current in an arc welding secondary is not uniformly bilateral. It is one object of the present circuit to optimize bilateral characteristics through the use of a single sensing circuit for the positive half cycle of voltage across the welding transformer 14. The sensing circuit 24 is energized from input conductor 26 connected to the upper terminal 28 of secondary transformer 14. While the other input for the sensing circuit 24 could be taken directly at the lower terminal 30 of the welding transformer secondary 14 to provide a voltage signal to the sensing circuit 24, it has been found advantageous to utilize a voltage divider comprising resistor 32 connected from the lower terminal 30 of welding transformer secondary 14 to a point 34 located between the output of the two SCRs 18 and 20 and the welding electrode 12. In a typical installation, it has been found that the use of a 150 ohm resistor for resistor 32 with the input tap 36 approximately one-third of the way up from the terminal 30 provides an optimum combination of voltage and current information to the sensing circuit 24. The sensing circuit 24 provides a shielded output indicated by the four conductors 38 and 40 to the phase control system 42 which in turn provides two shielded outputs 44 and 46 to the two gate drivers contained in the driver block 22. The two outputs from the drive block 22 to the SCRs 18 and 20 are also carried in shielded conductors 48 and 50 for reasons which will be described below.

The welder control indicated by broken line 52 may be any of several commercially available welder controls for any conventional welding technique. While the particular description relates primarily to an MIG welding operation, all of the theory and circuitry can readily be adapted to other types of arc welding. The mode of operation depends upon the current control setting generally indicated by the knob 54 which controls a current to a DC control winding 56 which in turn controls the saturation level of a saturable reactor 58. Such a DC control of a saturable reactor is well-known in the art and will not be described in greater detail. The AC winding 60 on the saturable reactor 58 is connected from ground through the secondary welding transformer winding 14, the pair of SCRs 18 and 20, the welding electrode 12 and the workpiece 10 which completes the circuit by connection to ground.

The welding control 52 may include various other devices and controls depending upon the type of welding to be performed. These may include voltage and current regulation systems, a control for the feed of the electrode 12 in a MIG system or the control for the feed of a separate weld wire (not shown) in the event of a TIG system or other system with a non-deteriorating electrode. Also within the general block 52 for welder control would be the control of the inert gas utilized to shield the electrode in the MIG or TIG systems. Also included within the welder control 52 in many systems is a high frequency system for strike assistance. Without such a system, it is generally necessary to touch the electrode 12 to the workpiece 10 and slight withdrawal of the electrode or reduced current may result in arc extinction. However, in many systems the welder control 52 includes a high frequency generator at a frequency in the order of 1–5 MHz which applied a high frequency signal in the area of the electrode and workpiece whereby RF ionization is produced in the workpiece area to produce a plasma enabling inital production of an arc without actually touching the electrode 12 to the workpiece 10. In such a system including RF plasma generation considerable interference is often experienced from spurious RF signals which effect the precision with which the circuits controlling current can function. Thus, the inputs 48 and 50 to the SCRs 18 and 20 are shielded, independent, electrically isolated systems as will be described in greater detail below. Similarly a shielded output system from the sensing circuit 24 to the phase control of 42 insure RF isolation.

The welder control is energized from a conventional 115 volt AC source 62. The source 62 also provides the 60 Hz input to the timing circuit 64.

As shown in FIG. 1, the 60 Hz clock signal is applied through conductors 66 to a shaper and inverter 68 which may be a conventional NOR gate. The output from the NOR gate 68 is applied through conductor 70 to NOR gate 72 for the high current interval timer and is also applied through conductor 74 to NOR gate 76 for the low current interval timer. The selection of these two inputs is determined by the NOR gates 72 and 76. As will be explained in greater detail below, the second inputs to the NOR gates 72 and 76, namely inputs 78 and 80, will cause the two timers to alternatively count in a sequential manner to control the interval of high current as a result of high timer 82 followed by the control of the interval of low current by the low timer 84.

During the high current interval controlled by timer 82, the terminal 86 is at a low potential drawing current through resistor 88 and light-emitting diode 90 so that the phase control 42 is conditioned to drive the gates 18 and 20 in the high current mode. Thus, the LED 90 indicates high mode operation in a manner which will be described in greater detail below. During this period NOR gate 92 is biased high to block NOR gate 76 so that the low timer is inoperative while NOR gate 94 has a high input to permit NOR gate 72 to pass the clock pulses from conductor 70 to high interval timer 82. Upon completion of the predetermined count in high interval timer 82, a low read-out pulse is applied through conductor 96 which is applied to NOR gate 94 to in turn apply a high signal through the conductor 78 to NOR gate 72 and block further clock pulses from conductor 70 to high interval timer 82.

At the same time a low reset signal is applied through conductor 98 to NOR gate 100 which in turn provides a high output pulse through capacitor 102 to reset the low interval timer 84 and enable commencement of operation of that timer. This produces a high output on conductor 104 through switch 106 and conductor 108. This produces a high output at terminal extinguishing the LED 90. It also causes the output of NOR gate 92 to go low, enabling NOR gate 76 to pass clock pulses to low interval timer 84. The impulses from the shaper 68 are then applied through conductor 74 to the NOR gate 76 which is now conditioned to pass pulses through conductor 81 to the low interval timer 84 which completes the low interval cycle.

Upon completion of the low interval, a low output signal is applied through conductor 104 and rotary switch 106 to conductor 108 and in turn to NOR gate 92 to produce a high output and condition the NOR gate 76 to an off condition and at the same time cause NOR gate 110 to go high providing an impulse through capacitor 112 to reset the high timer 82 causing output 96 to go high and in turn switch NOR gate 94 to provide a lower output and to pass clock pulses from conductor 70 through NOR gate 72 to high interval timer 82 and commence a complete subsequent timing cycle.

With the dial of switch 106 in the "0" position, the path from conductor 104 to conductor 108 is open whereby line 108 remains at a high level and the phase control operates continuously in the low current mode.

Figure 3:
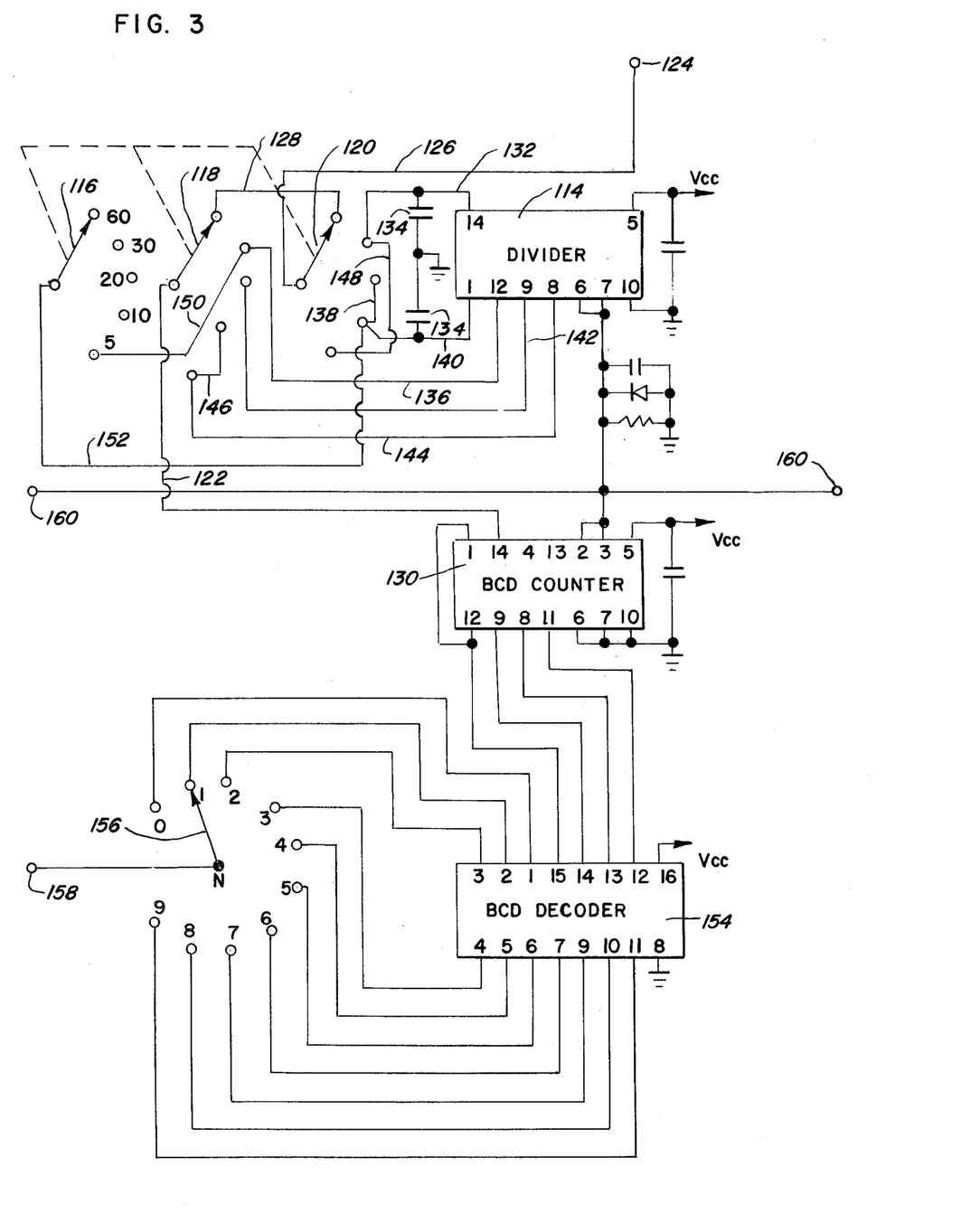
FIG. 3 is a circuit diagram for one of the two interval timers forming a part of FIG. 1.

The actual circuit contained within high interval timer 82 and low interval timer 84 is illustrated in FIG. 3. This circuit includes three Fairchild commercially available integrated circuits and the connections to the integrated circuit are shown without internal detail. The first, a Fairchild 7492 is a divide-by-12 counter having outputs whereby the circuit can divide by 2, 6, or 12. This circuit including the integrated circuit 7492 designated divider 114 in FIG. 3 functions in combination with a fine-position three-bank rotary switch having wipers 116, 118 and 120 connected in such a manner that the output from the circuit appearing at conductor 122 can be selected by the rotary switch to represent the denominator of one of various fractions of a second of high interval timing or low interval timing. Thus, the timer circuit of FIG. 3 has an input 124 which receives 60 pulses per second as a clock input. This clock input for the high interval timer is connected to the output of NOR gate 72 and for the low current interval timer the input terminal 124 is connected to the output of NOR gate 76. In the position shown in FIG. 3, the three switches are in the position marked 60 whereby a direct path is provided from input terminal 124 through conductor 126, switch wiper 120, conductor 128, switch wiper 118 and conductor 122 into terminal 14 of the BCD counter 130 which is a Fairchild 7490 integrated circuit. Thus, in this position the denominator of the timing ratio is 60 and each impulse at conductor 122, the input to the BCD counter 130, represents 1/60 of a second. If the wipers 116, 118 and 120 are shifted to the second position which is a denominator of 30, the input passes through conductor 126 and wiper 120 to conductor 132 and input 14 to the divider network 114. The capacitors 134 connected to ground are for noise suppression. An output pulse appears at terminal 12 for every second input pulse to terminal 14 of divider 114 whereby in the second position of the rotary switches, an output appears on conductor 136 which is applied through wiper 118 to output 122 which comprises the input to the BCD counter 130. Thus, each pulse appearing on conductor 122 represents a timer interval of 1/30 of a second and these pulses actuate the subsequent numerator counting system to be described.

In a similar manner when the rotary switches 116, 118 and 120 are in the third position marked "20", the input pulses from terminal 124 pass through conductor 126 and wiper 120 to conductor 138 which is connected to the fourth terminal and then to conductor 140 and input 1 of the divider network 114. The output in this 1/20 position is taken from terminal 9 of the divider network 114 and applied through conductor 142 to the wiper 118 and in turn to conductor 122 and input to terminal 14 of the BCD counter 130. In this position, every third input pulse at terminal 124 produces a single output pulse at conductor 122 thus providing the denominator of 1/20 of a second per output inpulse.

In the next position of the rotary switches 116, 118 and 120, the input pulses from input 124 are applied through conductor 126 and wiper 120 to the fourth terminal which in turn is connected through conductor 140 to input 1 of divider 114. In this position the output from divider 114 is taken from output terminal 8 and applied through conductor 144 and conductor 146 to wiper 118 and in turn conductor 122 and the input to the BCD counter 130. In this position, there is one output pulse on conductor 122 for each six input pulses at terminal 124 and thus, the denominator of the time fraction is 10.

Finally in the fifth position of the three wipers on the rotary switch, the input pulses are applied from terminal 124 through conductor 126 and wiper 120 to conductor 148 which is in turn connected to the second terminal associated with wiper 120 and thus, applied through conductor 132 to input 14 of the divider network 114. For every other input pulse to input terminal 14, an output pulse appears at terminal 12 of the divider network 114 which is carried by conductor 136 to the second terminal associated with wiper 118 and from there through conductor 150 to the fifth terminal associated with wiper 116. This alternate impulse is then applied from wiper 116 to conductor 152, to conductor 140 and in turn to input 1 of divider network 114.

For each six impulses applied from conductor 140 to input terminal 1 of divider 114 there is an output at conductor 8 and thus, for each 12 input pulses through conductor 132 to input 14 there is one output pulse at terminal 8 through conductor 144 to the fifth contact associated with wiper 118. Thus, for every 12 input pulses, there is an output pulse on conductor 122 which is applied as the input at terminal 14 of the BCD counter 130. Thus, for this fifth position of the rotary switches, each output pulse on conductor 122 represents a denominator 5 in the time fraction.

The BCD counter 130 is conventional and in the instant specific example was a Fairchild 7490 integrated circuit. Terminals 2 and 3 are "reset to zero" terminals and terminals 12, 9, 8 and 11 constitute the four digits of a binary coded decimal output. The interconnection between terminals 1 and 12 is required by the manufacturer to make the device function as a serial input BCD counter. No further explanation of the binary coded decimal counter and its four outputs is believed necessary. These four outputs are directly applied to inputs 12, 13, 14 and 15 of the BCD decoder 154 which in the particular embodiment described is a Fairchild 7445 integrated circuit providing ten separate decimal outputs, namely terminals 1 through 7 and 9 through 11 representing the digits 0 through 9 respectively. Again, this device is well-known commercially available product requiring no further explanation. It should suffice to state that for each input pulse to terminal 14 of BCD counter 130, the output of BCD decoder 154 will step to the next subsequent terminal and thus, will appear at the next subsequent contact on the rotary N switch 156.

Thus, for the positions shown for the switches in FIG. 3, the time measured by the timer circuit is 1/60 of a second as determined by the rotary switches. For each 60th of a second, there is one impulse at output terminal 122 from the divider network 114 to the input terminal 14 of the BCD counter 130. This will produce a "one" count out of the BCD decoder 154 which will appear at the "one" contact associated with wiper 156 and thus, there will be an output pulse at output terminal 158 and that output pulse will be generated following a time interval of 1/60 of a second. If the upper rotary switches 116, 118 and 120 are shifted to their second position, it will be apparent that an output pulse will be created at output conductor 122 which in turn is applied to the BCD counter 130 to produce an output pulse at terminal 158 in 1/30 of a second. Following the same procedure, if the wiper 156 is rotated to the No. 2 position, then an impulse would be created on conductor 122 for every 30th of a second time interval and this would produce an input to the BCD counter 130 which would cause the BCD decoder to step through its digits at 1/30 of a second intervals so that wiper 136 in position No. 2 would sense an output pulse after a time lapse of 2/30 of a second or 1/15 of a second which would be the timer interval applied to the output terminal 158. Applying the same logic throughout the available range of settings, setting the wipers 116, 118 and 120 in their fifth position and the wiper 156 in its tenth position, the time lapse would be 9/5 or 1-4/5 seconds from the time of the first impulse at input 124 to an output impulse at terminal 158. This timer provides a unique range of time values with a minimum of circuitry in a manner which is extremely advantageous in the above-described pulsed arc weld control system.

In the high current interval timer 82, the output terminal 158 is connected to the output conductor 96 shown in FIG. 1 and this is in turn connected to the NOR gate 94 so that when the output terminal 158 shows a read-out, the voltage at the terminal 158 goes down toward zero volts causing the NOR gate 94 to go high thus, blocking the NOR gate 72 preventing any further impulses from the inverter 68 and conductor 70 from being applied to the input of the high current interval timer 82. At the same time the voltage applied through conductor 98 to NOR gate 100 causes NOR gate 100 to go positive creating a pulse through capacitor 102 to the input 160 shown in FIG. 3. This resets the divider network 114 and the BCD counter 130. Resetting of the BCD counter 130 in the low current interval timer 84 causes all outputs of the decoder 154 to go high cutting off current through the resistor 88 and LED 90 to the phase control 42 and causing NOR gate 92 to have a low output making NOR gate 76 receptive to impulses from conductor 74 to produce input pulses on conductor 81 to the low current interval timer input terminal 124. The low current cycle will then be completed in the manner already described until such time as there is a low current interval read-out at the wiper 156 of the timer 84. When the low output appears at terminal 158 of the low timer 84, this signal is passed through conductor 104 to switch 106 and back through conductor 108 to terminal 86 where it causes the output of NOR gate 92 to go high blocking NOR gate 76 from further impulses. At the same time a high output from NOR gate 110 is differentiated through capacitor 112 to reset timer 82 and open NOR gate 72.

As will be apparent from the foregoing description, the interval timers 82 and 84 will provide a first interval of from 1/60 of a second to 1-4/5 seconds during which LED 90 is conducting, terminal 86 is at a low level and phase control 42 is receiving a signal indicating that the welder should be operating in the high current mode. At the completion of that interval a second interval is commenced for low current as controlled by low current timer 84 and this interval may be from 1/60 of a second 1-4/5 seconds. During this period, terminal 86 is high, LED 90 is off and the phase control 42 is receiving a signal indicating the low current mode in the welding circuits and providing phased SCR control.

Figure 4:
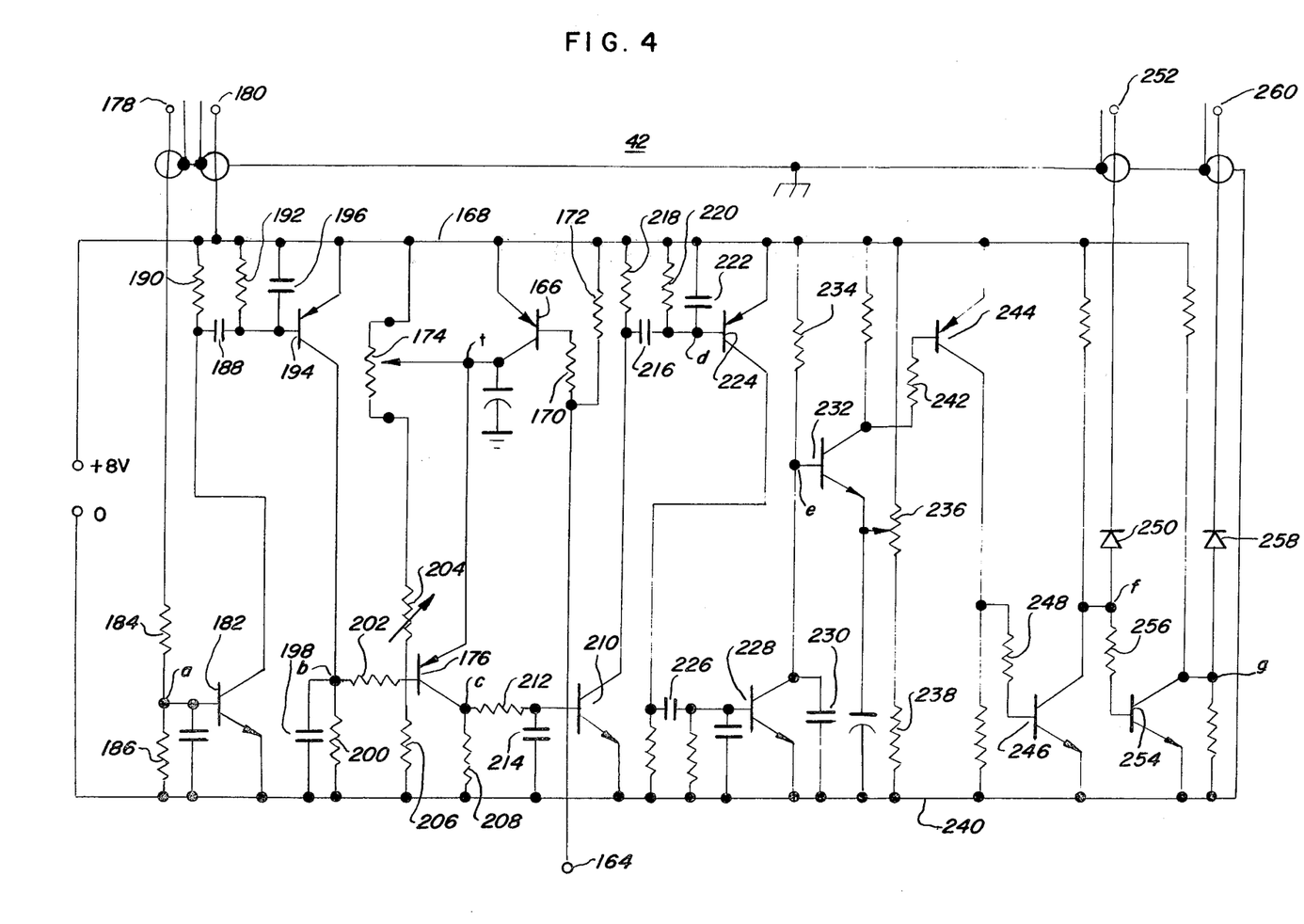
FIG. 4 is a circuit diagram of the phase control circuit of FIG. 1.

Reference will now be made to FIG. 4 illustrating the phase control circuit 42. The output from the timer circuit discussed above is applied to terminal 164 in FIG. 4 and as was already discussed when terminal 164 is at a low voltage the timer is indicating to the phase controller that the welding circuits should be in the high current mode. When 164 is at a high voltage, LED 90 in FIG. 1 is extinguished and the timing circuit is indicating to the phase control that the welder should be in the low current mode. This is accomplished by switching the transistor 166 to an on condition for high current operation and an off condition for low current. The emitter or transistor 166 is connected to the plus 8 volt bus 168 while the base of transistor 166 is connected through resistor 170 and resistor 172 to the 8 volt bus 168. Thus, when terminal 86 in FIG. 1 is high or at 8 volts, LED 90 is nonconductive, the base of transistor 166 is at 8 volts and the transistor 166 is off. Conversely when 86 is low, LED 90 is conducting and lighted indicating the high current mode and in this condition current is flowing from emitter to base in transistor 166 and through resistor 170 turning transistor 166 full on.

The effect of this switching between the high current and low current modes in the phase control circuit 42 is as follows. When transistor 166 is full on, it effectively bypasses the potentiometer 174 and applies the full voltage of bus 168 to the emitter of transistor 176. This turns transistor 176 full on and as will be explained the conventional welder controls contained in the block 52 of FIG. 1 then control the high current mode and the saturable reactor 58 determines the current level in this mode.

Figure 2:
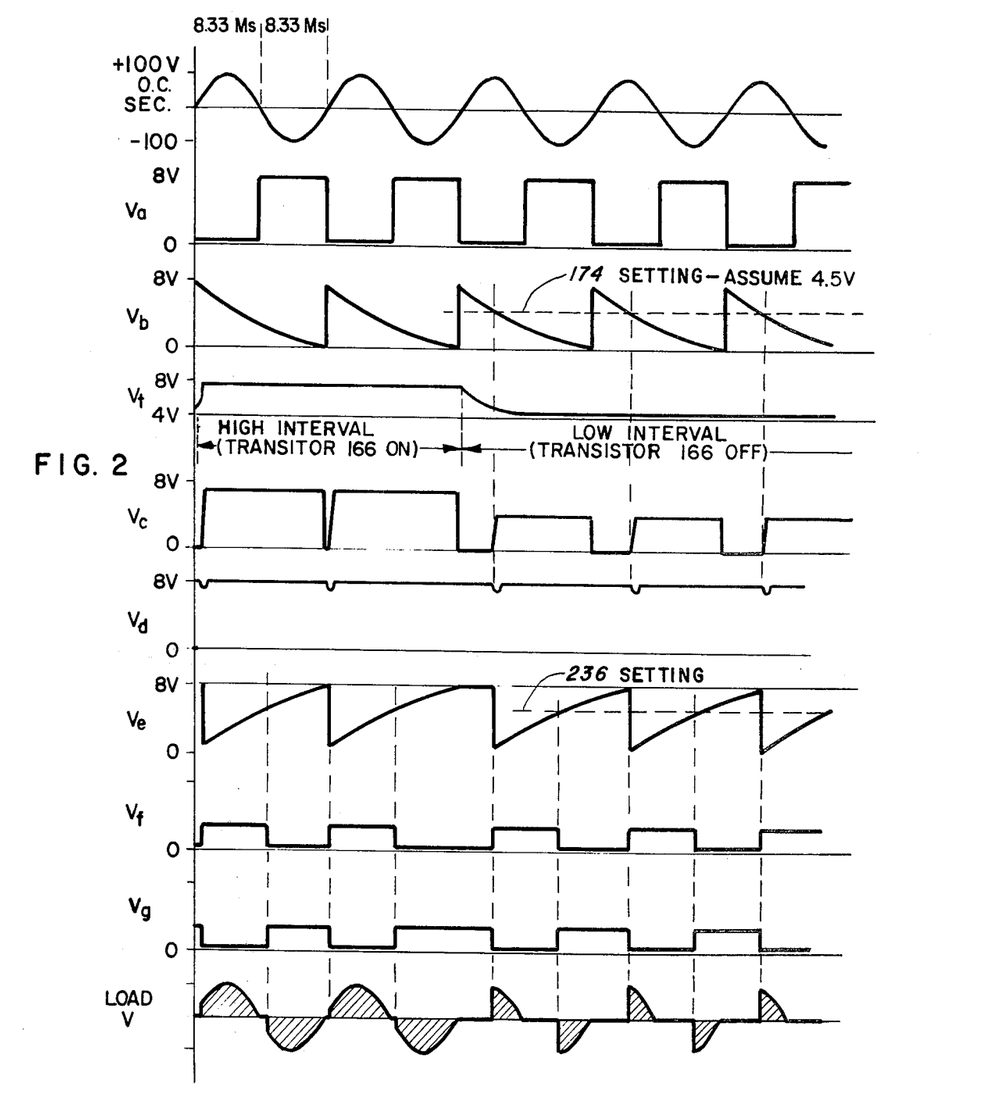
FIG. 2 is a series of wave shapes illustrating the operation of the phase control circuit of FIG. 1.

When transistor 166 is off the voltage appearing at the emitter of transistor 176 is determined by the position of the wiper of potentiometer 174 and this potentiometer constitutes the ratio control which in turn controls the background current or low current level established by the phase control circuit 42. The manner in which the entire phase control circuit functions will be understood from a consideration of the signal applied to the input terminals 178 and 180 from the sensor 24. The sensor output between terminals 178 and 180 is in effect a variable impedance which is high when there is no welding voltage in secondary 14 and which rapidly decreases as the welding voltage rises. Thus, for a rising welding voltage, the voltage at terminal 178 rises toward the 8 volt level of terminal 180 and this rising voltage is applied to the base of input transistor 182 through the voltage divider comprising resistors 184 and 186. The signal at terminal 178 is sufficient to rapidly saturate the transistor 182 to provide a signal $V_a$ as shown in FIG. 2. This relatively square signal is applied through a differentiating network comprising capacitor 88 and resistors 190 and 192 to the base of transistor 194. Capacitor 196 eliminates noise and provides some integration. The output pulse from transistor 194 charges capacitor 198 and thereafter transistor 194 is cut off and capacitor 198 discharges through resistor 200 to produce the voltage $V_b$ shown in FIG. 2 through resistor 202 on the base of transistor 176. As $V_b$ reaches its initial peak, transistor 176 is biased off and remains off during the sloping decay of $V_b$ to a point which is determined by the setting of the potentiometer 174 and the associated variable resistor 204 and fixed resistor 206. The variable resistor 204 determines the maximum value of the background or low current level and the potentiometer 174 sets the actual level at which transistor 176 begins to conduct. Thus, for example, if potentiometer 174 is adjustable so that the emitter of transistor 176 is at 4 volts, transistor 176 will remain nonconductive until the charge across capacitor 198 decays to about four volts when transistor 176 will begin to conduct producing an output voltage across resistor 208.

The voltage appearing on the base of transistor 210 is applied through resistor 212 and appears across capacitor 214. This voltage is shown as $V_c$ in FIG. 2. The voltage has a wave shape generally similar to the wave shape of $V_b$ but is delayed a time which is determined by the setting of potentiometer 174. As will be clear as the description proceeds, this time delay which may be from zero to 8.3 M seconds determines the time at which the two SCRs will initiate conduction in the conventional triggered operation and thus, will determine the energy per cycle which is applied to the electrode and workpiece.

The output of transistor 210 is differentiated by capacitor 216 in conjunction with resistors 218 and 220. Capacitor 222 provides some integration and eliminates noise appearing at the base of transistor 224. The signal appearing at the base of transistor 224 is shown by the wave shape $V_d$ in FIG. 2 and constitutes a series of pulses which are delayed in time following the voltage rises shown by wave shape $V_a$ by the amount necessary to provide the deired current limitations for the low current mode of operation. This in turn will represent the "off" time in each cycle of the SCR's. These pulses are applied through differentiating capacitor 226 to a further amplifier stage comprising transistor 228. The network including capacitor 226 and the transistor 228 further shaped the delayed impulses which are shown by $V_d$.

Transistor 228 acts as a grounding switch to bypass capacitor 230 which is normally charged to approximately plus 8 volts and upon discharge, the transistor 232 is cut off by vitue of the base falling to near zero potential. The capacitor 230 then begins to charge as shown by $V_e$ in FIG. 2 through resistor 234 until the base of transistor 232 rises to a potential above that appearing on the emitter. The emitter voltage is determined by the setting of the potentiometer 236 which is connected in series with resistor 238 between the 8 volt bus 168 and the ground bus 240. The potentiometer 236 is adjusted to produce a voltage at the emitter of transistor 232 which will provide an 8.3 millisecond delay from the time of the impulse appearing on the base of transistor 228 to the time when transistor 232 begins to conduct. Transistor 232 will then continue to conduct until the next impulse appears on transistor 228 which will again discharge capacitor 230 and provide a square-wave signal at 232 comprising an 8.3 M second off time followed by an 8.3 M second on time as shown generally by the wave form $V_f$. This signal is applied through resistor 242 to amplifying transistor 244 and in turn to transistor 246 through resistor 248.

The signal appearing at point f shown in FIG. 4 is illustrated by the wave form $V_f$ in FIG. 2 and this signal is applied through diode 250 to output terminal 252 which is in turn applied to one of the gate-driving circuits contained in gate driver 22 through conductor 44. The signal at f is also applied to transistor 254 through resistor 256 so that a plus voltage at point f renders transistor 254 conductive dropping point g to near zero volts as shown by the wave form $V_g$ in FIG. 2. The wave form $V_g$ is applied through diode 258 to terminal 260 where it is connected to the gate drivers 22 through conductor 46 shown in FIG. 1. Because of the spurious signals which exist in welding equipment of this kind resulting both from the welding current and steep wave forms involved therein and the 5 mHz striking signal both the inputs 178 and 180 and the outputs 252 and 260 of the phase control system 42 are shielded. As will appear from the signals $V_f$ and $V_g$ the output signals appearing at terminals 252 and 260 of the phase control circuit 42 are periodic signals varying at a rate of 60 times per second and are generally in the nature of square waves having steep rise times delayed from the initial open circuit weld signal shown at the top of FIG. 2 by a time dependent upon the energy desired during the low current or background period of welder operation. The duration of this interval is determined by the setting of ratio potentiometer 174 and the initiation of the phasing operation performed by circuit 42 is determined by the input at terminals 178 and 180 from the sensor of FIG. 6. The total duration of the low current mode cycle is determined by the timer signal on input 164.

Figure 5:
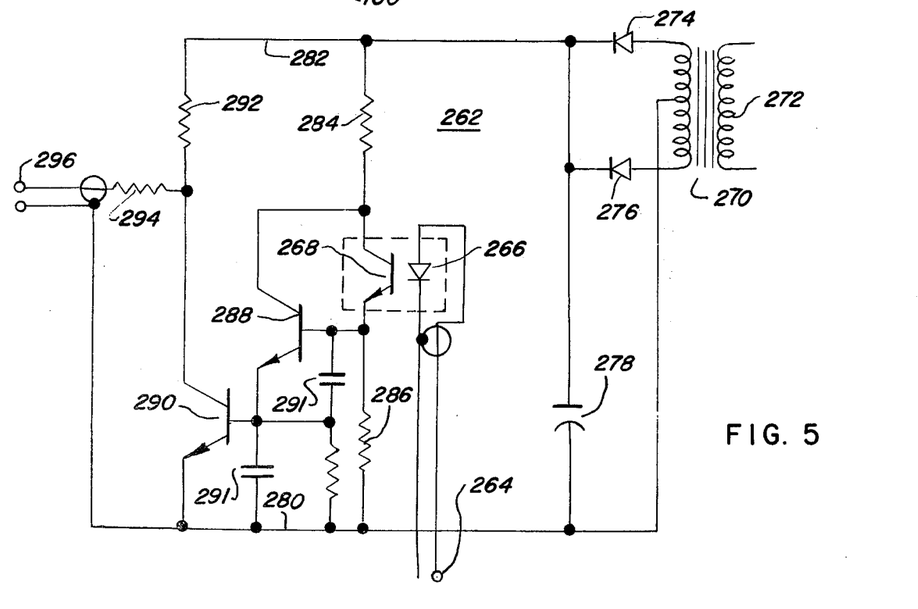
FIG. 5 is a circuit diagram of one of the drivers contained in the gate driver of FIG. 1.

Referring now to FIG. 5, one gate driver 262 is illustrated. An identical second gate driver is present within the gate driver box 22. The input terminal 264 of the gate driver 262 is connected to either output 44 or output 46 of phase control 42 as shown in FIG. 1. When the output signal of phase control 42 appearing at terminal 252 goes positive and this is applied through conductor 44 to input terminal 264 of the gate driver 262, the light-emitting diode 266 is illuminated turning on the light-sensitive transistor 268. In order to obtain an independent voltage reference for the SCR's isolation from RF and spurious welding noise, each of the drivers 262 is provided with an isolation transformer 270 having a primary 272 connected to an AC source and a secondary connected to diode rectifiers 274 and 276 providing full wave rectification. Capacitor 278 provides filtering so that the power supply voltage appears between zero voltage bus 280 and the plus voltage bus 282. Transistor 268 has its collector connected through resistor 284 to the positive bus 282 and its emitter connected through resistor 286 to the bus 280. The output of the light-sensitive transistor 268 is applied to the base of transistor 288 where it is amplified and applied to the base of transistor 290. The collector of transistor 290 is connected through resistor 292 to the positive bus 282. Thus, when the light-sensitive transistor 268 is dark, the voltage of bus 282 appears through resistor 284 at the collector of transistor 288 but the base is at zero potential whereby the transistor 288 is off and the transistor 290 is similarly off. Upon experiencing light, the transistor 268 turns on dropping the collector voltage but raising the base voltage on transistor 288 turning that transistor on. That in turn raises the base voltage on transistor 290 and turns transistor 290 on so that a voltage drop is experienced through resistor 294 which appears at gate driver output terminal 196. Gate driver output terminal 296 is applied through conductors 50 to the SCR 20 shown in FIG. 1 which holds SCR 20 for conduction. That is, when transistor 290 is off, SCR 20 is conducting through a full half cycle. When transistor 290 is on or conducting, the SCR control is biased negatively holding the SCR 20 in a nonconductive state. With this arrangement the SCR is held on to insure the arc against interruption from spurious noise. The capacitors 291 are typical as used for noise suppression and to avoid the effect of spurious signals.

An identical gate driver 262 is associated with phase control output 46 which is applied to input terminal 264 shown in FIG. 5. In this case, the output terminal 296 shown in FIG. 5 is applied to conductors 48 and controls SCR 18 in an identical manner but 180° out-of-phase with the operation of SCR 20.

Figure 6:
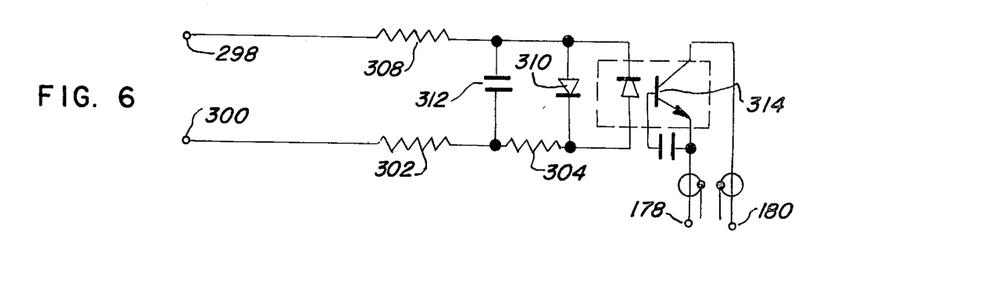
FIG. 6 is a circuit diagram for the sense circuit of FIG. 1.

The sensing circuit 24 of FIG. 1 is shown in FIG. 6. Sensor input terminal 298 is connected to conductor 36 of FIG. 1 and sensor input terminal 300 is connected to conductor 26 of FIG. 1. As the secondary winding 14 experiences a rising positive voltage at point 28, this rising positive voltage is applied through conductor 26 and terminal 300 through resistors 302 and 304 to light-emitting diode 306. On the reverse half cycle, the positive voltage appearing at input terminal 298 causes a current through resistor 308 which is bypassed through diode 310. Capacitor 312 provides noise suppression. Thus, on the rising half cycle, light-emitting diode 306 produces light which turns on the light-emitting transistor 314 providing a low impedance path for current to flow in the phase control circuit shown in FIG. 4. As already discussed, the light-sensitive transistor 314 is effectively connected across the input terminals 178 and 180 of phase control circuit 42 whereby a rising positive voltage at terminal 300 in the sensor circuit of FIG. 6 produces light in diode 306 which produces a low impedance in transistor 314 producing a positive pulse on the base of transistor 182 of phase control circuit 42.

The action of phase control circuit 42 to produce a time-delayed SCR turn on pulse for each of the SCRs 18 and 20 has already been described and is believed manifest. It is believed clear from the skill of the art with respect to SCRs that delay in the turn on time of the SCR controls the energy applied to the weld electrode 12 in each half cycle whereby the background or low current mode of operation is controlled.

From the foregoing, it will be clear that a unique system has been provided for digital control of the time interval for high level welding current as well as a digital control for low current or background level operation of a pulsed arc welding system, in combination with a unique solid-state switch system in the secondary circuit of a welding transformer to gate the secondary circuit on and off at predetermined times to accurately and precisely control the level of background or low current operation. By this circuit, it is possible to perform overhead and vertical welding without loss of puddled metal and perform other operations heretofore considered to be impossible or impractical with greatly reduced tendency to burn through or produce excessive penetration.

What is claimed is:

1. Arc welding apparatus for connection to power source means providing a periodic voltage of predetermined magnitude and period, said apparatus being utilized in welding a conductive work piece and comprising
   a. welding transformer means having a secondary winding,
   b. electrode means electrically coupled to a first point on said secondary winding,
   c. conductor means for connection to said work piece and electrically connected to a second point on said secondary winding whereby a weld voltage between said electrode means and said conductor means provides welding heat at said work piece,
   d. gate means in circuit with said secondary winding, said conductor means and said electrode means to periodically switch between an effective conductive condition and an effective non-conducting condition at least once during each period of said power source means, said secondary winding, said electrode means, said conductor means and said gate means being in series to form a weld current circuit, said gate means comprising two controlled rectifiers connected in parallel with opposite polarity, and
   e. means directly electrically connected to said weld current circuit including first means for generating a voltage dependent upon current, other than said weld current, conducted through said gate means and second means for sensing the magnitude and phase of a summation of the voltage across said secondary winding and said voltage generated by said first means, said second means providing an output signal to control said rectifiers whereby said rectifiers become conductive at predetermined times in accordance with the sensed magnitude and phase.

2. Arc welding apparatus according to claim 1 wherein said gate means is directly connected to said first point and couples said secondary winding to said electrode means and said first means is connected across the combination of said secondary winding and said rectifiers and comprises an output port, and said second means comprises means for detecting a voltage appearing across said output port of said first means and said first port of said secondary winding.

3. Arc welding apparatus according to claim 1 including:
f. control means having an input connected to the output of said sensing means, having a first output controlling the conduction in one of said rectifiers and a second output controlling the conduction in the other of said rectifiers, and having phase adjusting means between said input and said outputs.

4. The arc welding apparatus of claim 3 wherein said phase adjusting means provides a signal initiating conduction in the other of said rectifiers at a time which follows the initiation of conduction in said one rectifier by a period substantially equal to one half of the period of said voltage.

5. The arc welding apparatus of claim 3 wherein said first output signal has a phase which is manually adjustable relative to the phase of said voltage whereby the energy dissipated through the secondary circuit is controlled thereby.

6. The welding apparatus of claim 1 in which a saturable reactive device is in said circuit to limit the weld current therein.

7. Arc welding apparatus for connection to power source means providing a periodic voltage of predetermined magnitude and period, said apparatus being utilized in welding a conductive work piece and comprising
a. welding transformer means having a secondary winding,
b. electrode means electrically coupled to one point on said secondary winding,
c. conductor means for connection to said work piece and electrically connected to a second point on said secondary winding whereby a weld voltage between said electrode means and said conductor means provides welding heat at said work piece,
d. gate means in circuit with said secondary winding, said conductor means and said electrode means to periodically switch between an effective conductive condition and an effective non-conducting condition at least once during each period of said power source means, said secondary winding, said electrode means, said conductor means and said gate means being series connected components of a weld current circuit, said gate means comprising two controlled rectifiers connected in parallel with opposite polarity,
e. control means for said gate means, said control means alternately providing a first-time interval during which said gate means permits conduction in said circuit at a relatively high current level followed by a second time interval during which said gate means permits conduction in said circuit at a relatively low current level, the sum of said time intervals being at least twice said period,
f. means directly electrically connected in shunt across said secondary winding and at least one other of said components of said weld current circuit, including first means for generating a voltage substantially solely in response to current, other than said weld current, conducted through said gate means, and second means for sensing the magnitude and phase of a summation of the voltage on said secondary winding and the voltage generated by said first means, said second means providing an output signal to control said rectifiers whereby said rectifiers become conductive at predetermined times in accordance with the sensed magnitude and phase.

8. The welding apparatus of claim 7 in which a saturable reactive device is in said circuit, and manually adjustable control means is coupled to said saturable reactive device to establish said relatively high level.

9. The welding apparatus of claim 8 wherein said gate means switches said circuit to an effective conductive condition at substantially all times during said high level interval and said gate means adjustably reduces the conduction in said circuit during said low level interval.

10. The welding apparatus of claim 7 wherein said gate means comprises means effectively providing unilateral threshold conduction devices connected in opposed parallel relationship with one another and in series in said circuit, and said control means in said phase control means having an input responsive to the signal on said secondary winding, a first phase controlled output connected to control one of said threshold conduction means and a second phase controlled output connected to the other threshold conduction means.

11. The welding apparatus of claim 7 in which said control means comprises timing circuit means, means providing a periodic signal input to said timing circuit means, a first output from said timing circuit means operatively applied to said gate means to control the duration of said first time interval and a second output from said timing circuit means operatively applied to said gate means to control the duration of said second time interval.

12. The welding apparatus of claim 11 wherein said timing circuit means comprises a first counter and a second counter, an output from said first counter to control said gate means to initiate said first time interval and to control an operative connection between said periodic signal input and said second counter, and an output from said second counter to control said gate means to initiate said second time interval and to control an operative connection between said periodic signal input and said first counter.

13. The welding apparatus of claim 12 wherein each of said counters comprises a digital counter having an input to receive said periodic signal input and a plurality of outputs representing a plurality of different counts and manually operable output selection means to selectively apply one of said plurality of outputs to control said gate means.

14. The welding apparatus of claim 13 wherein each of said counters comprises a dividing counter to provide a plurality of divided outputs each representing a different divided count, manually adjustable means to select one of said divided outputs, counting means having an input connected to the output of said manually adjustable means and having a plurality of count outputs each corresponding to a different number of input pulses, and manually adjustable selector means to select one of said count outputs to provide the output of said counter.

15. Arc welding apparatus for connection to power source means providing a periodic voltage of predetermined magnitude and period, said apparatus being utilized in welding a conductive work piece and comprising welding transformer means having a secondary winding terminating at first and second terminals;

two controlled rectifiers connected in parallel and with opposite polarity, the anode of a first of said rectifiers being connected to said first terminal of said secondary winding;

electrode means connected to the cathode of said first controlled rectifier;

saturable reactive means having direct current ports adapted to be connected to a source of direct current, said saturable reactive means terminating at a first terminal thereof connected to said second terminal of said secondary winding, and a second terminal thereof adapted for connection to a work piece to conduct weld current therethrough; and control means for controlling the conduction of said controlled rectifiers comprising first and second resistance means and first means for generating a signal between first and second terminals thereof in response to a signal appearing across third and fourth terminals thereof, said third terminal thereof being connected to said first terminal of said secondary winding and said fourth terminal being connected through said first resistance means to said second terminal of said secondary winding and through said second resistance means to said cathode of said first controlled rectifier, the ratio of the resistance of said second and first resistance means being a predetermined, finite magnitude, and second means connected to said first and second terminals of said first means for effecting conduction of said controlled rectifiers during alternate intervals of selectively variable duration at differing effective current levels.

* * * * *

UNITED STATES PATENT AND TRADEMARK OFFICE
CERTIFICATE OF CORRECTION

PATENT NO. : 3,989,922
DATED : November 2, 1976
INVENTOR(S) : Michael D. Fahey

It is certified that error appears in the above-identified patent and that said Letters Patent are hereby corrected as shown below:

| | |
|---|---|
| Col. 1, line 32 | Before "efforts" insert --various-- |
| Col. 3, line 44 | "difference" should be --differences-- |
| Col. 4, line 40 | "applied" should be --applies-- |
| Col. 5, line 28 | After "terminal" insert --86-- |
| Col. 5, line 44 | "lower" should be --low-- |
| Col. 5, line 60 | "fine-position" should be --five-position-- |
| Col. 7, line 27 | After "is" insert --a-- |
| Col. 8, line 44 | After "second" insert --to-- |
| Col. 9, line 34 | "88" should be --188-- |
| Col. 9, line 49 | "adjustable" should be --adjusted-- |
| Col. 11, line 39 | "196" should be -- 296 -- |

UNITED STATES PATENT AND TRADEMARK OFFICE
CERTIFICATE OF CORRECTION

PATENT NO. : 3,989,922
DATED : November 2, 1976
INVENTOR(S) : Michael D. Fahey

It is certified that error appears in the above—identified patent and that said Letters Patent are hereby corrected as shown below:

| | |
|---|---|
| Col. 11, line 68, to Col. 12, line 1 | "light-emitting" should be --light-sensitive-- |
| Col. 14, line 29 CLAIM 10 | "in said" (2d occurrence) should be --is a-- |

Signed and Sealed this

Twenty-eighth Day of June 1977

[SEAL]

Attest:

RUTH C. MASON
Attesting Officer

C. MARSHALL DANN
Commissioner of Patents and Trademarks